United States Patent [19]

Ornsteen

[11] 4,093,485

[45] June 6, 1978

[54] METHOD FOR FORMING A HOT MELT ADHESIVE CARTRIDGE

[76] Inventor: Robert L. Ornsteen, Shore Rd., Cape Neddick, Me. 03902

[21] Appl. No.: 801,846

[22] Filed: May 31, 1977

[51] Int. Cl.² ............................................. B29D 23/04
[52] U.S. Cl. ................................ 156/244.13; 156/250; 156/325; 156/327; 156/334; 156/500; 222/146 R; 222/146 HE; 222/325
[58] Field of Search .............. 156/244, 327, 334, 500, 156/325, 250; 425/5, 114, 133.1, 392, 804; 222/146 R, 146 HE, 325

[56] References Cited

U.S. PATENT DOCUMENTS

| | | | |
|---|---|---|---|
| 3,552,259 | 1/1971 | Griffith | 425/133.1 |
| 3,668,288 | 6/1972 | Takahashi | 156/244 |

*Primary Examiner*—Caleb Weston
*Attorney, Agent, or Firm*—Weingarten, Maxham & Schurgin

[57] ABSTRACT

A method for continuously forming a hot melt adhesive cartridge having a non-stick, thermoplastic outer coating. The hot melt adhesive cartridge is formed by extruding a sleeve of non-stick, thermoplastic material having a predetermined outside dimension, cooling the sleeve to cause setting of the thermoplastic and introducing a hot melt adhesive into the set sleeve.

7 Claims, 4 Drawing Figures

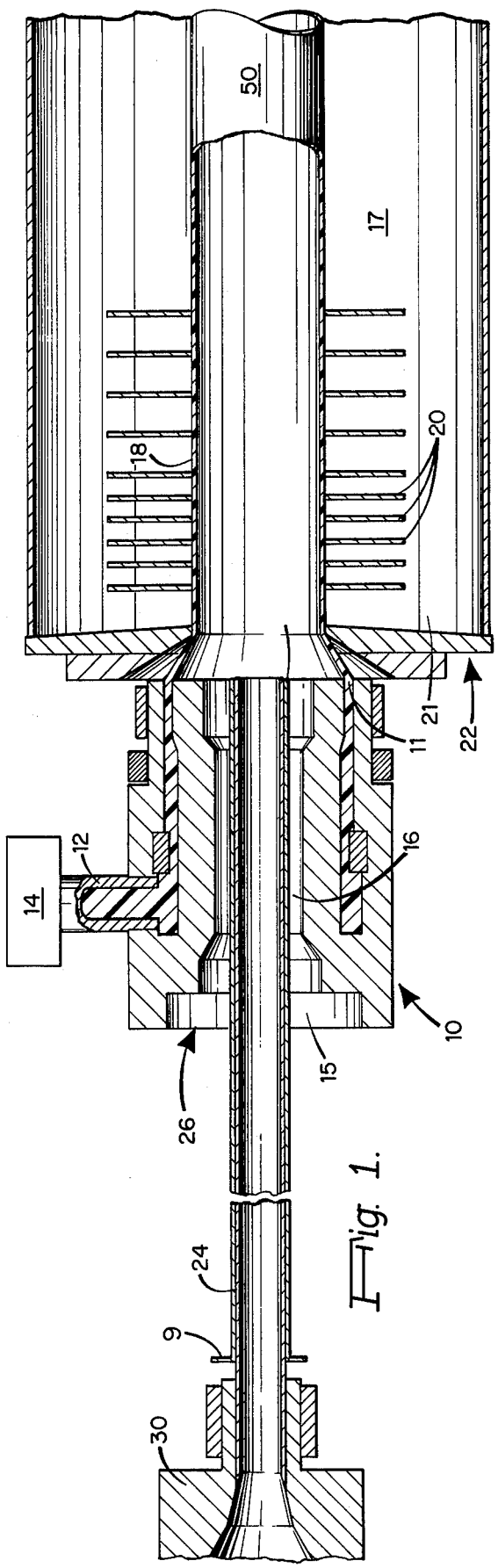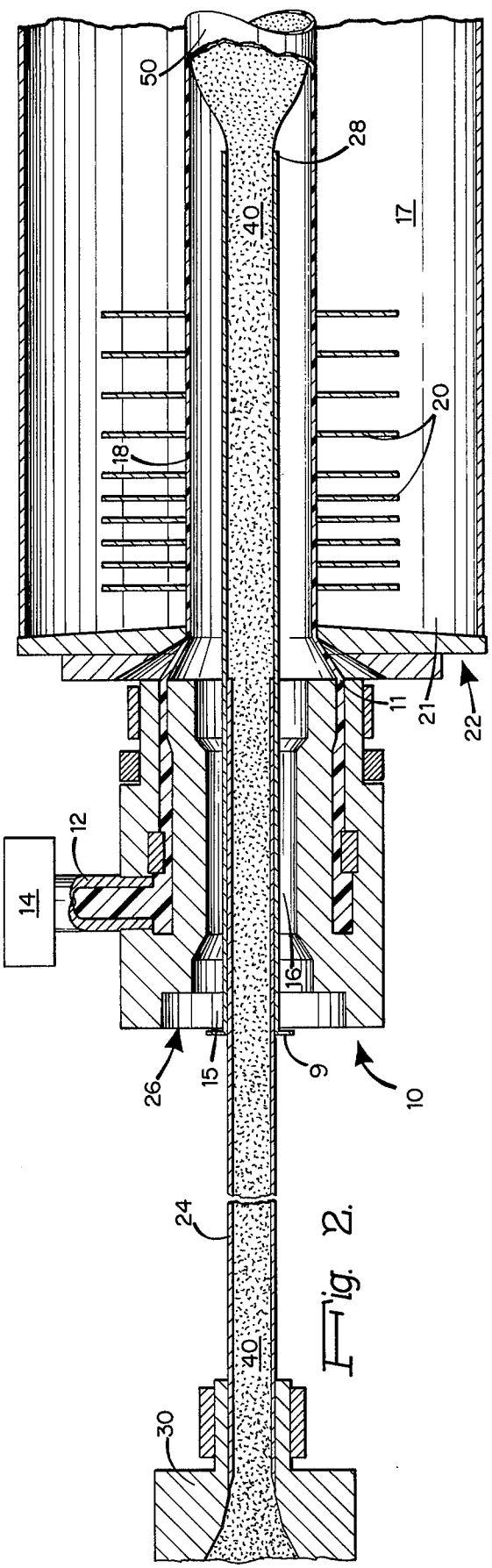

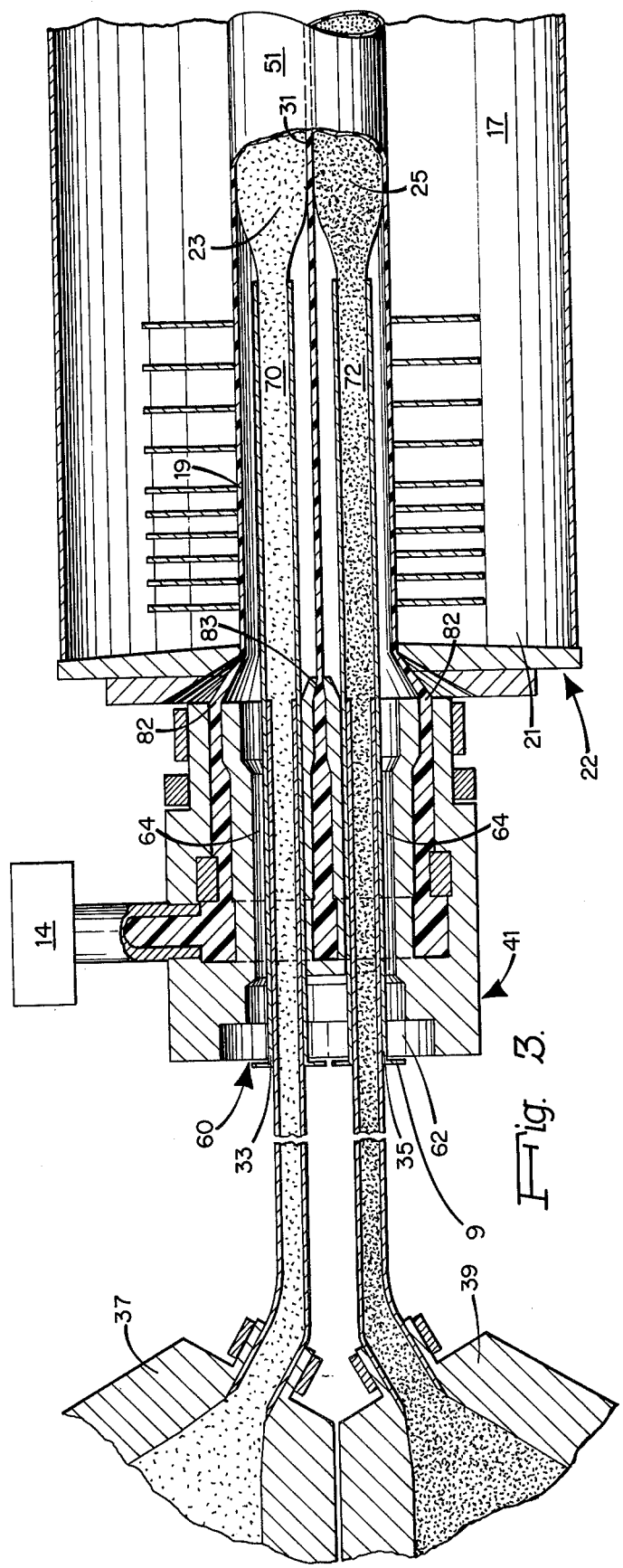
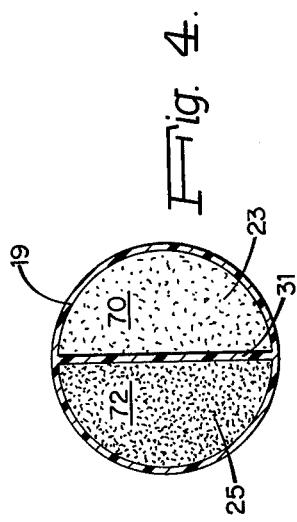

METHOD FOR FORMING A HOT MELT ADHESIVE CARTRIDGE

FIELD OF THE INVENTION

This invention relates in general to plastic extrusion processes and more particularly to a continuous, post-filling process for forming a non-stick, thermoplastic coated hot melt adhesive cartridge.

BACKGROUND OF THE INVENTION

In hot melt adhesive guns, such as shown in U.S. Pat. No. 3,877,610, the hot melt adhesive is in the form of a cylindrical cartridge which is introduced into the gun chamber for melting and dispensing out of the gun nozzle. The adhesive cartridge is formed of a homogenous adhesive material having an intended melting temperature and adhesive properties. Many adhesive materials are relatively soft at room temperature and have tacky surface characteristics and are difficult to form to a predetermined outside dimension. The outside dimension of an adhesive cartridge, usually the diameter of a cylindrical cartridge, must be maintained within close tolerances to not impair proper gun operation. If the cartridge diameter is too large, the cartridge will not be freely movable in the gun chamber and can prevent propulsion of the cartridge into engagement with the heater within the chamber for melting of the forward portion of the cartridge. If the cartridge diameter is too small, melted adhesive in the gun chamber can tend to back-up into the clearance space between the undersized cartridge and the surrounding chamber wall. As a result, the chamber can become clogged, and the cartridge can jam within the chamber, preventing further cartridge propulsion for heating and dispensing.

An object of the invention is to provide a hot melt adhesive cartridge having a thermoplastic outer layer which provides an accurately dimensioned cartridge having a non-stick surface characteristic. Such a cartridge having an outer, non-stick, thermoplastic layer is known but has been made by a batch technique which does not lend itself to continuous and inexpensive mass production.

According to the technique previously employed by the applicant herein, a non-stick, thermoplastic sleeve is disposed within a rigid paperboard or other container, the sleeve then being filled with molten hot melt adhesive. After solidification of the adhesive, the adhesive and surrounding sleeve is removed from the supporting container. This technique is limited to the formation of relatively short lengths of adhesive of usable cartridge size, or of a larger size which is then cut into usable cartridges. In addition, this technique requires the use of a support container which must later be removed.

It would be useful to form a hot melt cartridge with a non-stick outer layer by a continuous extrusion process; however, known extrusion processes have not been satisfactory by reason of the particular characteristics of hot melt adhesives. In one known extrusion process commonly referred to as post-coating, a thermoplastic material is extruded through a shape die to form an intended configuration. The extrusion then passes through a second die for application of a coating thereon.

This known technique is not suitable for hot melt materials due to the tackiness of the material, its low viscosity and very slow setting characteristics. Shape integrity cannot be maintained especially for larger diameters, and therefore an accurately sized adhesive cartridge cannot be formed. In another known extrusion process referred to as co-extrusion, two extruders feed a cross-head die to simultaneously extrude a core and surrounding outer shell. In this latter process, the core material must be extruded at a much lower temperature than the shell material to maintain continuous shape integrity and avoid deformation of the shell. The elevated temperatures necessary to form a homogeneous hot melt core render this known extrusion process unsuitable.

SUMMARY OF THE INVENTION

In brief, the present invention provides a method for continuously forming a hot melt adhesive cartridge having a core of hot melt material and a surrounding outer sleeve of thermoplastic material which has a non-stick surface and which is formed to an accurate outside dimension. According to the novel process, a sleeve of relatively fast-setting, non-stick, thermoplastic material is formed by extrusion and is cooled, sized and set to a predetermined outside dimension and shape. A hot melt core is extruded or pumped into the previously sized and set sleeve to completely fill the interior space of the sleeve. The resulting adhesive cartridge remains of accurate size and shape with the surrounding shell providing a non-stick outer surface. The continuous extrusion is cut at intended lengths to provide individual cartridges for use in adhesive dispensing guns.

DESCRIPTION OF THE DRAWINGS

The invention will be more fully understood from the following detailed description taken in conjunction with the accompanying drawings in which:

FIG. 1 is a side elevation view of the apparatus for practice of the present invention;

FIG. 2 is a side elevation of the apparatus for practice of the present invention;

FIG. 3 is a top plan view of an alternative apparatus for practice of the present invention; and FIG. 4 is a cross-end view of the separated sleeve shown in FIG. 3.

DETAILED DESCRIPTION OF THE INVENTION

Referring to the drawings, there is shown an apparatus for practice of the novel method for continuously forming a hot melt cartridge according to the invention. A shape die 10 is provided having an inlet tube 12 for introduction of thermoplastic, non-stick material from an extruder 14. A passageway 26 having an inlet opening 15 and a central orifice 16 is provided through shape die 10 to allow the introduction of a thermoplastic core material from a second extruder 30. The shape die 10 is operative in a known manner to extrude a continuous hollow sleeve 18. Sleeve 18 may be formed in a variety of shapes, depending on intended use. In accordance with the invention, a hollow sleeve 18 is formed of a thermoplastic, non-stick material, such as polyethylene, the sleeve being extruded from the annular orifice 11 of shape die 10. The hollow sleeve is drawn through a sizing apparatus 22 which includes a spaced array of sizing wafers 20 extending through a vacuum chamber 21 provided within apparatus 22.

The vacuum chamber 21 urges hollow sleeve 18 into engagement with the surrounding wafers 20 which are spaced along the vacuum chamber and having aligned openings through which sleeve 18 is drawn and of a predetermined dimension for sizing of the sleeve. The vacuum chamber also includes a water bath 17 for cooling of sleeve 18 into a solidified set condition at a point downstream from the shape die 10. The extruder, water bath and vacuum sizing apparatus are all of well-known construction and are commercially available. The apparatus 22, as an example, can be a Differential Pressure Calibrator manufactured by Gatto Manufacturing Corporation, Hauppauge, Long Island.

For practice of the novel process, a core dispensing tube 24 extends from extruder 30 through passageway 26 and out central orifice 16 of die 10 into extruded sleeve 18, the end 28 of tube 24 being disposed at a position downstream from die 18 at which the sleeve is in a solidified set condition and properly sized. Generally, sleeve 18 is first continuously formed and cooled to a solidified set condition, as shown in FIG. 1. The core dispensing tube 24 is then extended from die 10 into the formed and set sleeve 18 for disposal of the hot melt, as shown in FIG. 2. The tube 24 can be of telescoping structure for slidable disposition of the extending length into sleeve 18. A ring 9 is provided at the end of tube 24 to facilitate longitudinal adjustment. Alternatively, core dispensing tube 24 may be fixed and extruder 30 may be slidably mounted to position end 28 at the aforementioned down-stream position. Furthermore, tubes of different lengths can be employed to suit specific extrusion requirements.

A hot melt adhesive core material 40 such as 50 parts ethylene, vinyl acetate and 50 parts tackifying resin is extruded or pumped from extruder 30, or other thermal pumping means, through core dispensing tube 24 and is dispensed from the tube end 28 into the interior of sleeve 28 to completely fill the sleeve. The sleeve 18 cannot deform during the introduction of hot melt adhesive core into the sleeve, since the sleeve is set at the point of dispensing of the core material and additionally immersed within the water bath 17.

The core 40 with surrounding sleeve 18 is cooled during transport through water bath 17 to form a solidified cartridge 50 of accurate outside dimension and having a thermoplastic outer surface of non-stick material. The continuously extruded cartridge 50 may then be passed through a conventional water trough and subsequently cut to intended lengths to provide individual cartridges for use in dispensing guns or other hot melt adhesive dispensing apparatus.

The described novel method may be employed to form a hot melt adhesive cartridge having dissimilar core materials. In this situation, a plurality of the aforementioned core dispensing tubes 24 may be provided to communicate each core material from a separate extruder into separate chambers formed within the extruded sleeve. For example, in FIG. 3, there is shown a continuous sleeve 19 having a centrally disposed separation wall 31 extending axially along the length thereof to provide two separate chambers 23 and 25. This sleeve is formed in well-known manner by shaped die 41 having annular orifice 82 and vertical orifice 83. A cross-end view of sleeve 19 is shown in FIG. 4. A passageway 60 having an inlet opening 62 and two central orifices 64 is provided through shaped die 41 to allow the introduction of two dissimilar thermoplastic core materials from respective extruders 37 and 39.

The sleeve 19 is cooled and sized to a predetermined outside dimension by the same apparatus 22 previously described with respect to sleeve 18. Two core dispensing tubes 33 and 35 extend respectively from extruders 37 and 39 through die 41 and into respective chambers 23 and 25. Core dispensing tubes 33 and 34, like the previously described dispensing tube 24, are disposed at a position downstream from die 41 at which sleeve 19 is in a solidified condition and properly sized.

Dissimilar hot melt adhesive core materials 70 and 72 are extruded or pumped from respective extruders 37 and 39 into core dispensing tubes 33 and 35 and dispensed from each tube end 78 and 79 into the interior of the chambers 23 and 25 to completely fill the sleeve 19. The resulting hot melt adhesive cartridge 80 may then be passed through a conventional water trough and subsequently cut to intended lengths.

By virtue of the invention, a wide variety of hot melt adhesive material can be employed irrespective of the tacky surface characteristics thereof or of the viscosity of the material. The integrally formed sleeve provides a non-stick outer surface and retains the overall cartridge in a predetermined sized condition.

The invention is not to be limited by what has been particularly shown and described, except as indicated in the appended claims.

What is claimed is:

1. A method for continuously forming a hot melt adhesive cartridge of accurate outside dimension and having a non-stick, thermoplastic outer sleeve comprising the following steps:
   continuously extruding a hollow sleeve of non-stick, thermoplastic material;
   sizing said continuously extruded sleeve to a predetermined outside dimension;
   cooling said sleeve to a solidified set condition; and
   introducing a hot melt adhesive material into said hollow sleeve by dispensing such material at a point downstream from the initial extrusion of said sleeve, at which point the sleeve has been cooled to a substantially solidified set condition.

2. A method according to claim 1 wherein said non-stick, thermoplastic material is polyethylene.

3. A method for continuously forming a hot melt adhesive cartridge of accurate outside dimension and having a non-stick, thermoplastic outer sleeve comprising the following steps:
   continuously extruding a hollow sleeve of non-stick, thermoplastic material;
   sizing said continuously extruded sleeve to a predetermined outside dimension;
   transporting a hot melt adhesive material within and along the length of said sized sleeve to a point downstream from the initial extrusion of said sleeve;
   cooling said sleeve to a solidified set condition; and
   introducing said transported hot melt adhesive into said sleeve by dispensing such adhesive at said point downstream from said initial extrusion of said sleeve, at which point the sleeve has been cooled to a substantially solidified set condition to thereby form a continuous hot melt adhesive cartridge having an outer non-stick, thermoplastic sleeve of accurate outside dimension and an inner hot melt adhesive core.

4. A method according to claim 3 further including the step of cutting said cartridge into predetermined lengths.

5. A method according to claim 3 wherein said transporting step includes:

inserting a dispensing tube into said sleeve to a predetermined position downstream from the initial extrusion thereof;

said transported hot melt adhesive being introduced into said sleeve from the downstream end of said dispensing tube.

6. A method according to claim 3 further including the steps of cooling said continuous hot melt adhesive cartridge; and cutting the cooled cartridge into predetermined lengths.

7. A method for continuously forming a hot melt adhesive cartridge having a non-stick, thermoplastic outer sleeve containing dissimilar separate hot melt materials, comprising the following steps:

continuously extruding a sleeve of non-stick, thermoplastic material having first and second separated chambers;

sizing said continuously extruded sleeve to a predetermined outside dimension;

cooling said sleeve to a solidified set condition;

introducing a first hot melt adhesive material into said first chamber at a point downstream from the initial extrusion of said sleeve, at which point the sleeve has been cooled to a substantially solidified set condition; and introducing a second hot melt adhesive material into said second chamber at a point downstream from the initial extrusion of said sleeve, at which point the sleeve has been cooled to a substantially solidified set condition.

* * * * *